US010063083B2

(12) United States Patent
LaMarre et al.

(10) Patent No.: US 10,063,083 B2
(45) Date of Patent: Aug. 28, 2018

(54) SYSTEM AND METHOD FOR LIMITING BATTERY CHARGING DURING STORAGE AND SHIPPING STATES

(71) Applicant: Dell Products, LP, Round Rock, TX (US)

(72) Inventors: Jim Leo LaMarre, Pflugerville, TX (US); Tuck Meng Chin, Singapore (SG); Kurt D. Gillespie, Pflugerville, TX (US); Adolfo S. Montero, Pflugerville, TX (US); Prabhash Kumar, Pflugerville, TX (US); Balasingh Ponraj Samuel, Round Rock, TX (US); Xiaomei Zhu, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 44 days.

(21) Appl. No.: 15/297,378

(22) Filed: Oct. 19, 2016

(65) Prior Publication Data

US 2018/0109116 A1    Apr. 19, 2018

(51) Int. Cl.
*H02J 7/00* (2006.01)
*G05F 1/66* (2006.01)

(52) U.S. Cl.
CPC ............... *H02J 7/007* (2013.01); *G05F 1/66* (2013.01); *H02J 2007/0095* (2013.01)

(58) Field of Classification Search
CPC ...... H02J 7/007; H02J 2007/0095; G05F 1/66
See application file for complete search history.

(56) References Cited

U.S. PATENT DOCUMENTS

| 4,583,034 A | * | 4/1986 | Martin | ................ | H02J 7/0078 320/134 |
| 5,684,382 A | * | 11/1997 | Fritz | .................... | H01M 10/44 320/164 |

(Continued)

FOREIGN PATENT DOCUMENTS

| EP | 0 693 815 A2 | 1/1996 |
| EP | 0 480 648 B1 | 1/1997 |

*Primary Examiner* — Ramesh Patel
(74) *Attorney, Agent, or Firm* — Prol Intellectual Property Law, PLLC; H. Kenneth Prol

(57) ABSTRACT

An information handling system operating a BMU controller may include a rechargeable battery, a BMU controller to determine battery charge percentage value, a memory device for storage of an internal data record indicating a first power-on setting, and the controller operatively coupled to the memory memory device and the rechargeable battery. The controller executing machine-readable executable code instructions to determine that the main memory contains no internal data record indicating a first power-on event and to limit the voltage received by the rechargeable battery such that percentage value of the charge of the rechargeable battery does not exceed a set percentage value charge limit during storage and shipment of the information handling system. The controller also receiving machine-readable executable code instructions operable to record an internal data record in the memory device indicating a first power-on event when the processor and main memory of the information handling system are next powered on from an off state and upon storing the internal data record indicating a first power-on setting to remove the set percentage value charge limit and allow the rechargeable battery to charge to full capacity.

20 Claims, 7 Drawing Sheets

(56) References Cited

U.S. PATENT DOCUMENTS

| | | | | |
|---|---|---|---|---|
| 5,917,305 A | * | 6/1999 | Faulk | G01R 31/3651 320/106 |
| 6,462,514 B2 | * | 10/2002 | Maloizel | H02J 7/0086 320/139 |
| 7,088,076 B2 | * | 8/2006 | Densham | H02J 7/0068 320/145 |
| 7,194,308 B2 | * | 3/2007 | Krig | A61N 1/3708 324/433 |
| 8,138,722 B2 | * | 3/2012 | Wang | H02J 9/005 307/140 |
| 8,154,255 B2 | * | 4/2012 | Wang | H01M 10/48 320/136 |
| 8,555,094 B2 | * | 10/2013 | Chueh | G06F 1/3203 713/320 |
| 8,766,602 B1 | * | 7/2014 | Kimes | H02H 9/001 320/137 |
| 8,942,935 B2 | * | 1/2015 | Michaels | A61N 1/3708 607/60 |
| 8,957,638 B2 | * | 2/2015 | Maetani | H02J 7/008 320/107 |
| 2014/0068310 A1 | * | 3/2014 | Sultenfuss | G06F 1/28 713/340 |
| 2016/0232356 A1 | * | 8/2016 | Barkelew | G06F 21/572 |

* cited by examiner

SYSTEM AND METHOD FOR LIMITING BATTERY CHARGING DURING STORAGE AND SHIPPING STATES

FIELD OF THE DISCLOSURE

The present disclosure generally relates to information handling systems, and more particularly relates to a system and method of limiting battery charging for information handling systems during storage and shipping states.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, a switch router or other network communication device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
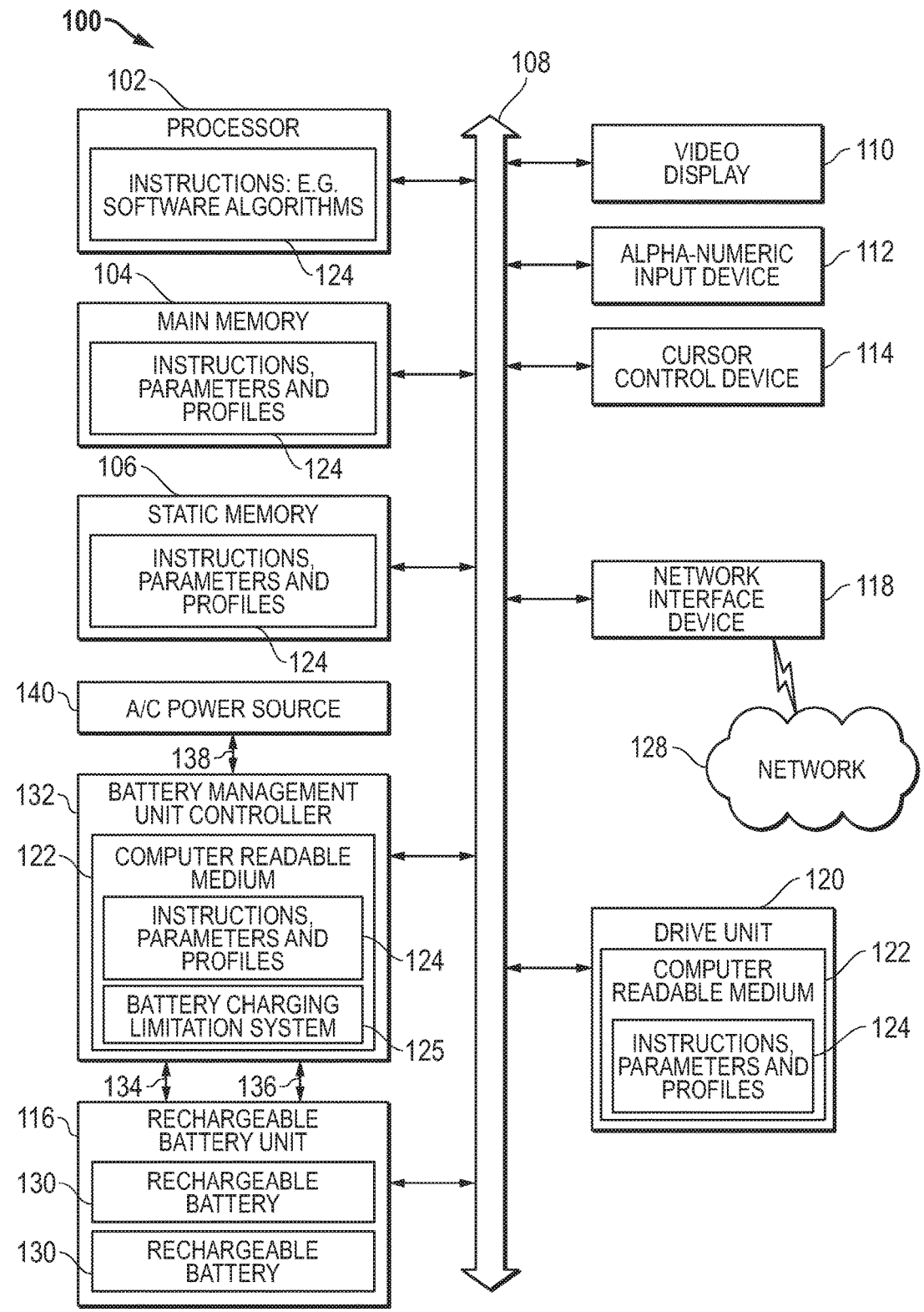
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Many information handling systems incorporate rechargeable batteries that may be shipped fully charged out of the factory in which they are produced. Storing or shipping a fully charged rechargeable battery over a period of time can degrade the battery, affect performance of the battery throughout its lifetime, and present safety issues. Purchasers of information handling systems often consider battery performance to be an important factor in choice of product to buy. Discharging a battery prior to storage or shipping can be time consuming, and manual factory processes to limit the battery charging, such as unplugging the AC adapter when above a high-threshold and re-inserting the AC adapter when below a low-threshold may be error prone and require additional human resources to manage and implement. An automated system is needed to limit the charge of information handling systems' rechargeable batteries, even while the rechargeable battery AC adapter is plugged in and/or the computing device is otherwise receiving A/C power, prior to storage or shipping so as to protect battery longevity and decrease safety risks associated with storage and shipping. Such a system may solve this problem by limiting the charge of the rechargeable battery to a desired percentage value of the full capacity of the rechargeable battery during the manufacturing, storage, and shipment of the information handling system to the end user. Such a system may further automatically remove this battery charging limitation once the end user receives the information handling system and powers-on the information handling system for the first time, without requiring any intervention on behalf of the end user, other than the normal action of powering on the system.

In the present disclosure, a battery management unit (BMU) may comprise a BMU controller and BMU driver code stored in BMU computer readable medium along with status data relating to the rechargeable battery. The BMU may be implemented across multiple devices and executed by one or more combination of processors or controllers. The BMU controller or BMU driver may implement a battery charge limitation system as executable code instructions according to several embodiments of the present disclosure. The BMU may establish a limit to the voltage received by a portable battery operatively connected to the BMU controller and an information handling system during storage and shipment of the information handling system. Limiting the voltage received by a rechargeable battery may occur by turning off a power rail supplying a rechargeable battery or may involve the BMU providing instructions to the battery to not accept any incoming power from a power rail supplying voltage. Several ways to limit incoming power or limit the voltage received for recharging the battery may be implemented as understood in the art in several embodiments. Limiting voltage received by a rechargeable battery refers to implementation of any strategy to stop voltage supplied or bar incoming power or otherwise hold a charge percentage at a rechargeable battery at a specified maximum level. In one example embodiment, a battery charge limitation system may instruct the BMU controller to determine whether the BMU computer readable medium of an information handling system contains an internal data record indicating a first power-on event of the information handling system. If the end user has not received the information handling system, and the device has not been tested for quality control purposes, the BMU computer readable medium in an embodiment may not include an internal data record indicating a first power-on event. However, the BMU computer readable medium may have a stored internal data record indicating a first power-on event if the end user has received the information handling system and powered it on, or if the information handling system has undergone a quality control check, to mimic and test end user experiences, requiring a first power on event.

The battery charge limitation system in an embodiment may instruct the BMU controller to set a first percentage value charge limit for implementation until a first internal data record indicating a first power-on event is stored in the BMU computer readable medium. The first percentage value charge limit may be implemented assuming the BMU controller determines no internal data record indicating a first power-on event of the information handling system is stored in the BMU computer readable medium in an example embodiment. For example, in an embodiment, the BMU controller may receive a machine-readable executable code instruction of the battery charge limitation system to set a first percentage value charge limit of 60%. The BMU controller in an embodiment may apply this first percentage value charge limit until after a storage period elapses, when the information handling system undergoes a quality control check, or until after the shipping period elapses, when the end user receives the information handling system and powers it on for the first time. The information handling system undergoing a quality control check or the end user powering on the information handling system for the first time may cause the BMU computer readable medium in an embodiment to store a first internal data record indicating a first power-on setting. This is only one example of a first percentage value charge limit, and other examples may include any percentage value between 1% and 99%.

In another aspect of an embodiment, if the BMU controller determines the BMU computer readable medium contains no internal data record recorded pursuant to a first power-on setting detecting a first power-on event, the battery charge limitation system may further instruct the BMU controller to store a first internal data record indicating a first power-on event when the processor and the BMU computer readable medium are next powered up from an off state. In yet a further aspect of an embodiment, the battery charge limitation system may further instruct the BMU controller to limit voltage received by the rechargeable battery, even while the rechargeable battery AC adapter remains plugged in, and/or the computing device otherwise receives A/C power, such that the percentage value charge of the rechargeable battery does not exceed the first percentage value charge limit which may be set at any desired level. For example, in an embodiment where the first percentage value charge limit is set to 60%, the BMU controller may limit the voltage received by the rechargeable battery, whether or not it is still plugged in, such that the percentage value charge of the rechargeable battery does not exceed 60% of the charge capacity of the rechargeable battery. Again, this is only one example of a first set percentage value charge limit, and other examples may include any percentage value between 1% and 99%. It has been found however, that benefits to later battery longevity increase as the percentage value charge of the rechargeable battery prior to shipment decreases away from 100%. In some aspects, battery longevity benefits may be greater as stored rechargeable battery charge capacity levels are kept lower during storage, but the optimal percentage may vary depending on the battery's underlying chemistry.

In yet another aspect of an embodiment, if the BMU controller determines the BMU computer readable medium contains no internal data record indicating a first power-on event, the battery charge limitation system may further instruct the BMU controller to remove the first set percentage value charge limit upon storage of the first internal data record of a first power-on setting, and allow the rechargeable battery to charge to full capacity.

In another embodiment, the processor and main memory may also receive power at a later instance in time. For example, the processor and main memory in an embodiment may receive power after the information handling system has been shipped and the end user has powered-on the device for the first time. In this scenario embodiment, the BMU controller may then execute code instructions of the battery charge limitation system to store a first internal data record indicating a first power-on event. In another aspect, the BMU controller may then execute a code instruction to remove the first set percentage value charge limit and allow the rechargeable battery to charge to full capacity. In such a way, the BMU controller may execute code instructions of a battery charge limitation system to limit the percentage value charge of a rechargeable battery prior to the end of manufacturing, storage, and shipment of the information handling system so the rechargeable battery is not fully charged during storage or shipment, but may also automatically allow the battery to charge fully once the end user receives the information handling system and powers it on. In an aspect of the embodiment, releasing the battery charge limitation may be executed without any further intervention required by the end user other than initiating the normal action of powering on the system.

In another embodiment, the processor and main memory may also receive power during a quality control check performed within the factory, before the information handling system is shipped to an end user. It is understood quality control testing procedures often involve the testing of a randomly selected sample portion of all information handling systems produced. In this scenario, the BMU controller in an embodiment may then execute code instructions of the battery charge limitation system to store a first internal data record indicating a first power-on event. In another aspect, the BMU controller may receive power from an alternating current source external to the information handling system, then execute a code instruction of the battery charge limitation system to remove the first set percentage value charge limit from the BMU computer readable medium such that the BMU controller allows the rechargeable battery to charge to full capacity, just as it would behave upon the end customer receiving and turning on the system. In such a way, the BMU controller in an embodiment may limit the percentage value charge of a rechargeable battery during a portion of the storage of the information handling system, but may allow the rechargeable battery to charge to full capacity during the quality control check performed within the factory. In addition, in such an embodiment, the BMU controller may execute code instructions of the battery charge limitation system allow the rechargeable battery to remain charged to full capacity prior to the shipment phase unless further steps are taken to reset the set percentage value charge limit. As described above, storing or shipping a fully charged rechargeable battery over a period of time can degrade the battery, affect performance of the battery throughout its lifetime, and present safety issues. Thus, further aspects of an embodiment may include the battery charging limitations system further instructing the BMU controller to limit the percentage value charge following the quality control check, or putting the system back through one or more steps of the manufacturing process that resets or sets certain stored data in the system leading to a potential change in the desired charging logic.

In yet another embodiment, after the quality control check of the information handling system has been performed, the BMU controller may receive code instructions of the battery charge limitation system to remove the first internal data record indicating a first power-on event has occurred from the BMU computer readable medium. In such an embodiment, this may allow for storage of a second internal data record indicating a second power-on setting to detect a later power-on event, such as, after the storage or shipment of the information handling system to the end user and then the end user powering on the device for the first time. In another aspect of an embodiment, the BMU controller may receive a code instruction of the battery charge limitation system to set a second percentage value charge limit for implementation until a second internal data record indicating a second power-on event is stored in the BMU computer readable medium. The BMU controller in an embodiment may then execute code instructions to limit the voltage received by the rechargeable battery and require the computing device to draw power necessary for all the operation of all of its processes from the rechargeable battery, despite the BMU controller simultaneously receiving voltage from an outside A/C source, until the percentage value charge of the rechargeable battery is equal to or less than the second set percentage value charge limit.

In another aspect, after receiving the code instruction to set a second percentage value charge limit, the BMU controller may also receive code instruction of the battery charge limitation system setting the system to detect and store a second internal data record when the second power-on event occurs. This setting to detect the next power-on event may be referred to as a second power-on setting that is set to detect when the processor and main memory next power on from an off state. In yet another aspect of an embodiment, the BMU controller may also receive code instructions of the battery charge limitation system to remove the second set percentage value charge limit upon the BMU controller storing the second internal data record indicating a second power-on event, and allowing the rechargeable battery to charge to full capacity. The second set percentage value charge limit may be the same or different than the first percentage charge limit and take effect during or after quality control testing. In an example embodiment, a higher level for the second percentage charge limit may be used to avoid a long required discharging to set the battery level below the second percentage charge limit level after testing. In an example, this may avoid any error conditions upon the next power on event caused by a higher charge level than the second percentage charge limitation permits in some embodiments.

In another embodiment, the processor and main memory may power up from an off state after the quality control check phase is complete. For example, the quality control checked processor and main memory in an embodiment may receive power after the information handling system has been shipped and the end user has powered-on the device for the first time. In this scenario, the BMU controller in an embodiment may then execute code instructions of the battery charge limitation system to store a second internal data record indicating a second power-on setting. In another aspect of an embodiment, the BMU controller may then also execute code instruction of the battery charge limitation system to remove the second set percentage value charge limit such that the rechargeable battery may charge to full capacity. In such a way, the BMU controller in an embodiment may allow the battery to charge fully during the quality control check performed in the factory, but may later limit the percentage value of the charge of a rechargeable battery during the shipment of the information handling system, and may also automatically allow the battery to charge fully once the end user receives the information handling system and powers it on, without any further intervention required by the end user.

In one embodiment, the battery charge limitation system is software code executable on one or more application processors, which may reside within the information handling system, and/or within any of the storage mediums of an information handling system. In other embodiments, the battery charge limitation system may be sourced from remote locations, for example via a hypervisor or other system, which may be associated with various devices of an information handling system. In yet further embodiments, some or all of the battery charge limitation system may include firmware executed via processors or controllers, such as the BMU controller, or may be hardcoded as an applied specific integrated circuit (ASIC) or other circuit to execute some or all of the operations described in the disclosure herein.

In one embodiment, BMU controller may comprise an embedded controller, or a microcontroller that handles system tasks that the operating system does not handle. The BMU controller in an embodiment may perform tasks related to managing battery charge. In an embodiment, the BMU controller may communicate with the main memory and the processor via a bus, and several forms of communication may be used, including ACPI, SMBus, or shared memory. The BMU controller in an embodiment may contain control settings that dictate the functionality of the rechargeable battery in the form of firmware. In an embodiment, the BMU controller may be incorporated within a power management unit controller that operates to perform the tasks associated with the BMU controller as well as other tasks associated with power management, including, but not limited to, operation of the information handling system's fan.

Examples are set forth below with respect to particular aspects of an information handling system for limiting battery charging of information handling systems during storage and shipping states.

FIG. 1 illustrates a generalized embodiment of information handling system 100. For purpose of this disclosure information handling system 100 can include any instrumentality or aggregate of instrumentalities as described above operable to compute, classify, process, transmit, receive, retrieve, originate, switch, store, display, manifest, detect, record, reproduce, handle, or utilize any form of information, intelligence, or data. For example, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other information handling system capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules described above, and operates to perform one or more of the methods described above. The information handling system 100 may execute code instructions 124, or a battery charge limiting system 125 for a BMU controller 132 that may operate on servers or systems, remote data centers, or on-box in individual client information handling systems according to various embodiments herein. In some embodiments, it is understood any or all portions of code instructions 124, or a battery charge limiting system 125 for a BMU controller 132 may operate on a plurality of information handling systems 100.

The information handling system 100 may include a processor 102 such as a central processing unit (CPU), a graphics processing unit (GPU), control logic or some combination of the same. Any of the processing resources may operate to execute code that is either firmware or software code. Moreover, the information handling system 100 can include memory such as main memory 104, static memory 106, BMU controller 132 memory, and drive unit 120 (volatile (e.g. random-access memory, etc.), nonvolatile (read-only memory, flash memory etc.) or any combination thereof). Additional components of the information handling system can include one or more storage devices such as static memory 106, BMU controller 132, and drive unit 120. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, a cursor control device 114, such as a mouse, touchpad, or gesture or touch screen input, and a rechargeable battery unit 116. A rechargeable battery unit 116 in an embodiment may include one or more rechargeable batteries 130, each of which may be controlled and removed or inserted individually, as separate battery packages, or together, as part of a single battery package. Each rechargeable battery 130 may be a type of electrical battery which can be charged, discharged into a load, and recharged many times. Examples of rechargeable batteries may include, but may not be limited to nickel cadmium batteries, nickel-metal hydride batteries, nickel-iron batteries, lead-acid batteries, lithium air batteries, lithium-ion batteries, and lithium-ion polymer batteries.

Network interface device 118 represents a network interface logic disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof. Network interface device 118 in an embodiment may operably connect to a network 128.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of code instructions 124, or a battery charge limiting system 125 that can be executed to cause the computer system to perform any one or more of the methods or computer based functions disclosed herein. For example, information handling system 100 includes one or more application programs 124, and Basic Input/Output System and Firmware (BIOS/FW) code instructions 124, and a battery charge limiting system 125. BIOS/FW code instructions 124, and a battery charge limiting system 125 functions to initialize information handling system 100 on power up, to launch an operating system, and to manage input and output interactions between the operating system and the other elements of information handling system 100. In a particular embodiment, BIOS/FW code instructions 124 reside in main memory 104, and include machine-executable code that is executed by processor 102 to perform various functions of information handling system 100. In another embodiment, a battery charge limiting system 125 resides in the BMU device 132 memory of information handling system 100, and includes machine-executable code that is executed by the BMU controller 132 to perform various functions of information handling system 100. In yet another embodiment (not illustrated), application programs and BIOS/FW code reside in another storage medium of information handling system 100. For example, application programs and BIOS/FW code can reside in static memory 106, drive 120, in a ROM (not illustrated) associated with information handling system 100 or other memory. Other options include application programs and BIOS/FW code sourced from remote locations, for example via a hypervisor or other system, that may be associated with various devices of information handling system 100 partially in main memory 104, static memory 106, drive unit 120 or in a storage system (not illustrated) associated with network interface device 118 or any combination thereof. Application programs 124, a battery charge limiting system 125, and BIOS/FW code instructions 124 can each be implemented as single programs, or as separate programs carrying out the various features as described herein. Application program interfaces (APIs) such Win 32 API may enable application programs 124 and a battery charge limiting system 125 to interact or integrate operations with one another.

In an example of the present disclosure, the BMU controller 132 may execute code instructions of the battery charge limiting system 125 as disclosed herein, and an API may enable interaction between the application program and device drivers and other aspects of the information handling system and a battery charge limiting system 125 thereon. The computer system 100 may operate as a standalone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The BMU controller 132 and the disk drive unit 120 may include a computer-readable medium 122 such as a magnetic disk in an example embodiment. The computer-readable medium of the main memory 104, static memory 106, drive unit 120, and BMU controller 132 may store one or more sets of code instructions 124, or a battery charge limiting system 125 such as software code corresponding to the present disclosure. While the computer-readable medium is shown to be a single medium, the term "computer-readable medium" includes a single medium or multiple media, such as a centralized or distributed database, a RAID of multiple storage devices, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The BMU controller computer readable medium 122 also contains space for data storage such as for a battery charge limiting system 125 for limiting the charge of the rechargeable battery unit 116. For example, the BMU computer readable medium 122 in an embodiment may contain space for storage for a first internal data record indicating a first power-on event, storage for machine-readable executable code instructions to set a first percentage value charge limit for the rechargeable battery unit 116, machine-readable executable code instructions of a first power-on setting to instruct the system to detect the next power-on event and store a first internal data record indicating a first power-on event 102 and main memory 104, and machine-readable executable code instructions to remove the first set percentage value charge limit for the rechargeable battery unit 116 upon next power up. As another example, the BMU computer readable medium 122 in another embodiment may contain space for storage of machine-readable executable code instructions to remove a first internal data record indicating first power-on event, machine-readable executable code instructions to remove a first percentage value charge limit for the rechargeable battery unit 116, a second internal data record indicating a second power-on setting, machine-readable executable code instructions to set a second percentage value charge limit for the rechargeable battery unit 116, machine-readable executable code instructions for a power-on event to detect and store a second internal data record indicating a second power-on event upon the next powering up of the processor 102 and main memory 104, and machine-readable executable code instructions to remove the second set percentage value charge limit for the rechargeable battery unit 116 upon next power up. In a particular embodiment, the instructions, parameters, and profiles 124 and a battery charge limiting system 125 may reside completely, or at least partially, within the BMU computer readable medium 122 during execution by the information handling system 100. Software applications may be stored in static memory 106, BMU 132, or disk drive 120.

The information handling system 100 may also include a BMU controller 132 that may be operably connected to the bus 108 and to an alternating current (A/C) source 142 external to the information handling system. The BMU controller 132 in an embodiment may comprise an embedded controller, or a microcontroller that handles system tasks that the operating system does not handle. The BMU controller 132 in an embodiment may perform tasks related to managing battery charge. In an embodiment, the BMU controller 132 may communicate with the main memory 104, the processor 102, and the rechargeable battery unit 116 via bus 108. The BMU controller 132 may alternatively communicate with the rechargeable battery unit 116 via buses 138 and 140. Several forms of communication may be used with respect to buses 108, 138, and 140, including ACPI, SMBus, or shared memory The BMU controller 132 in an embodiment may contain control code instructions that dictate the functionality of the rechargeable battery in the form of firmware.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include software, including firmware embedded at a device, such as a Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. In an example embodiment, the BMU controller 132 and battery charge limitation system 125 above as described in the present disclosure may be embodied as hardware, software, firmware or some combination of the same. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

In accordance with various embodiments of the present disclosure, the methods described herein may be implemented by firmware or software programs executable by a processor, controller, embedded controller or the like in an information handling system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
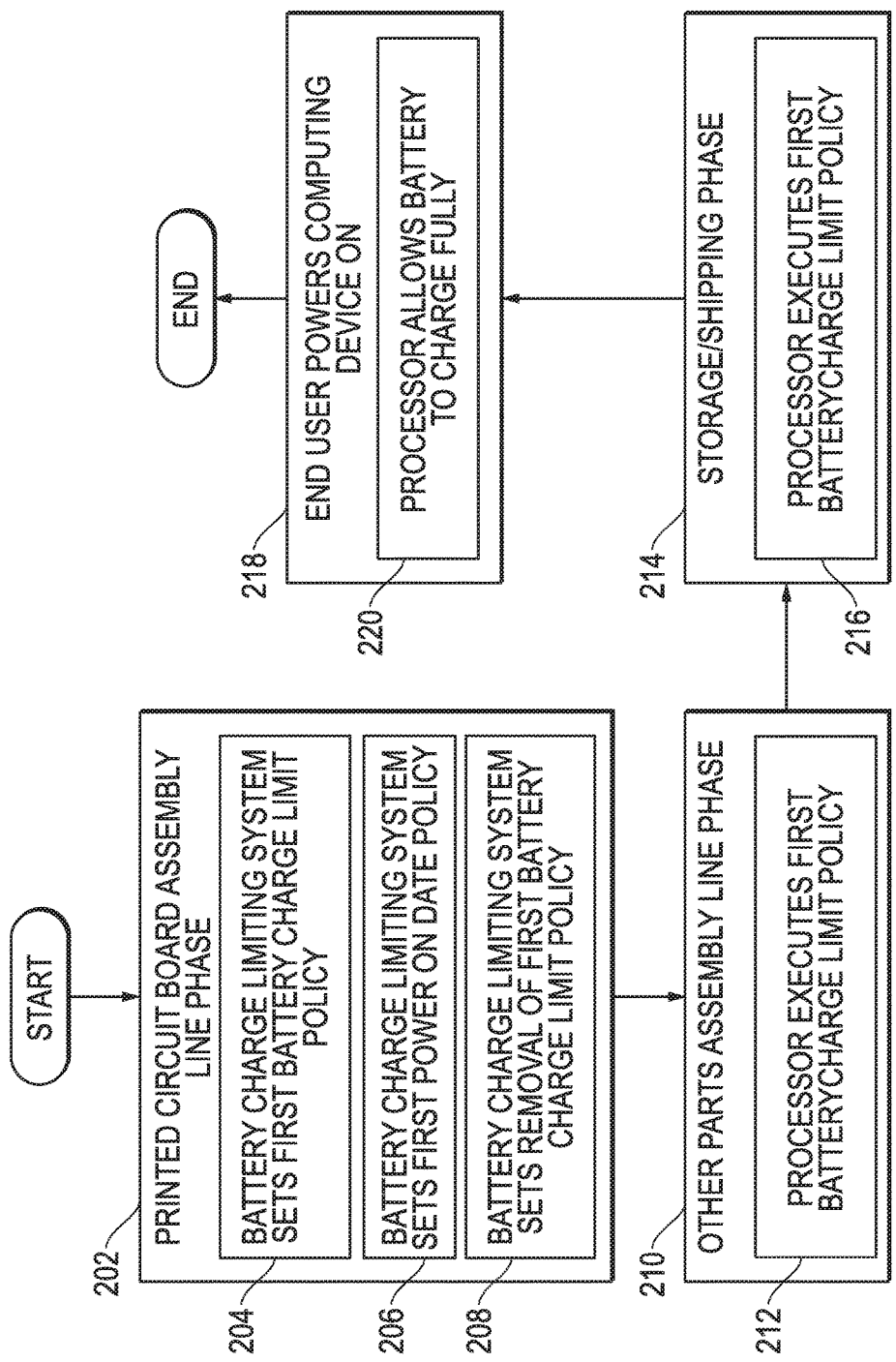
FIG. 2 is a flow diagram illustrating a method of limiting the charge of a rechargeable battery of an information handling system prior to delivery to an end user according to an embodiment of the present disclosure.

FIG. 2 is a flow diagram illustrating a timeline of events occurring during factory manufacture and shipment of an information handling system, according to an embodiment of the present disclosure. As shown in FIG. 2, the manufacture and shipment of an information handling system may include a printed circuit board assembly phase 202, an other parts assembly line phase 210, a storage/shipping of information handling system phase 214, and may end with an end user powering on the information handling system 218. As shown in block 202, during the printed circuit board assembly line phase in an embodiment, the battery charge limitation system may set a first battery charge limit 204, a first power-on setting to instruct the battery charge limitation system to detect and store an internal record of the next power-on event 206, and a removal of first battery charge limit setting 208. The first battery charge limit 204 in an embodiment may instruct the BMU controller to limit the amount of voltage, or set a battery mode to not accept incoming power, received by the rechargeable battery to a set limit. The first power-on setting 206 in an embodiment may instruct the BMU controller to detect and store a first internal data record in the BMU computer readable medium upon the next power up of the processor, indicating a first power-on event. The removal of the first battery charge limit setting 208 may instruct the BMU controller to remove the first battery charge limit upon storage of a first internal data record indicating a first power-on event in the BMU computer readable medium and to allow the rechargeable battery to charge to full capacity.

As shown in block 210, in an embodiment, the other parts assembly line phase may occur. The other parts assembly line phase in an embodiment may include integration of the printed circuit board with other parts of the information handling system, including, but not limited to the rechargeable battery. During this phase, the BMU controller in an embodiment may execute the code instructions of the battery charge limitation system to automatically limit the charge of the rechargeable battery 212 to a first set percentage value of the full battery charge capacity once the processor is again powered on.

In an embodiment, the other parts assembly line phase may produce a fully assembled information handling system, ready for storage or shipment from the factory. Further, upon completion of the printed circuit board assembly line phase 202, after the other parts assembly line phase 210, or after completion if the information handling system build the battery charge limitation system may invoke the first power-on setting 206 such that at the next power-up of the information handling system will record this as a first power-on event. The battery charge limitation system will store a first internal data record indicating the occurrence of the first power-on event. In an aspect, this is done before a period of storage or shipping of the information handling system, possibly during an early stage of manufacturing. As described above, storing or shipping a fully charged rechargeable battery over a period of time can degrade the battery, affect performance of the battery throughout its lifetime, and present safety issues. Further, discharging a battery prior to storage or shipping can be time consuming, and manual factory processes to limit the battery charging, such as unplugging the AC adapter when above a high-threshold and re-inserting the AC adapter when below a low-threshold may be error prone and require additional human resources to manage and implement. Automatically limiting the amount of charge the rechargeable battery may receive throughout the other parts assembly line phase may circumvent these issues in an embodiment.

As an example, in an embodiment, the BMU controller during the assembly line phase 210 may limit the voltage received by the rechargeable battery such that the rechargeable battery may not charge beyond 60% of the full capacity of the rechargeable battery. This is just one example embodiment, and other embodiments may include the BMU controller limiting the voltage, or setting the battery's mode to not accept incoming power, received by the rechargeable battery such that the rechargeable battery may not charge beyond any set percentage value of the full charge capacity of the rechargeable battery between 1% and 99%.

As shown in block 214, in an embodiment, an information handling system may also undergo a storage and/or shipping phase in which the information handling system, having been fully assembled, may be stored for some time prior to shipping to the end customer, and shipped to the end customer. In some instances, the shipping phase of the information handling system may be protracted, such as, when the end user is geographically located distantly from the manufacturing facility or when the method of shipping is slow like with ocean transit. During the storage and shipping phase of an information handling system in an embodiment, as shown in block 214, the BMU controller has limited the amount of voltage received by the rechargeable battery 216 to the set first limit to avoid degrading the battery, affecting battery lifetime performance, and presenting safety issues. The BMU controller in an embodiment may continue to enforce this set limit until the process is powered on again, even if the computing device is connected to an outside A/C source before the processor is powered on again.

As shown in block 218, in an embodiment, following the manufacturing, storage, and shipping phases, the end user may receive and power on the information handling system. The end user powering on the information handling system in an embodiment may signify to the BMU controller that the storage and shipping phase of the information handling system has concluded. In an embodiment, once the end user receives the information handling system, it may be no longer desirable to limit the charge of the rechargeable power to any number below 100%. As such, in an embodiment, the BMU controller may execute the code instructions of the battery charge limitation system to remove the first battery charge limit, and allow the battery to charge to full capacity after the end user powers on the information handling system.

Figure 3:
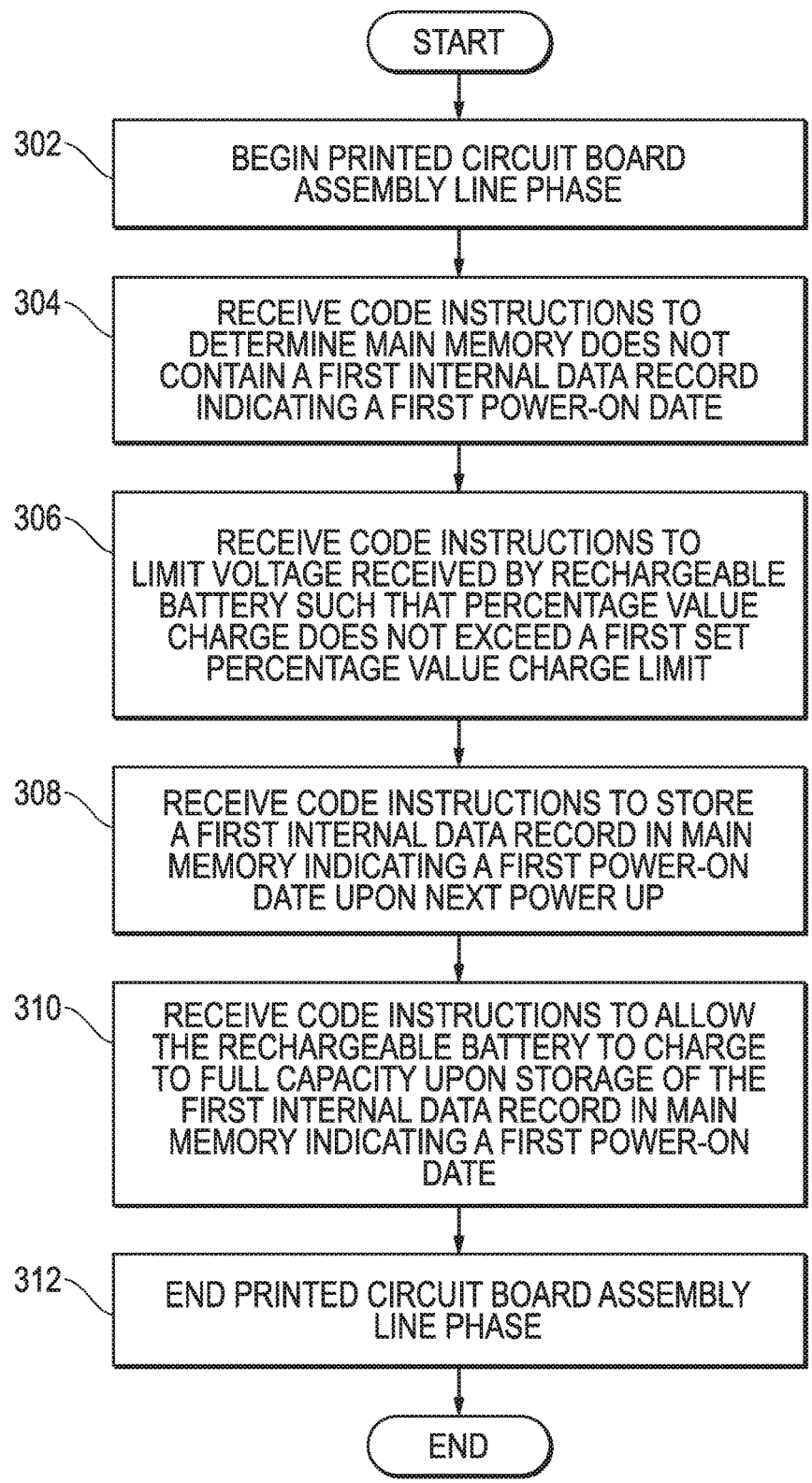
FIG. 3 is a flow diagram illustrating a method of instructing a BMU controller of an information handling system to limit the charge of a rechargeable battery prior to shipping or storage according to an embodiment of the present disclosure.

FIG. 3 is a flow diagram illustrating a method of instructing a BMU controller to automatically limit the charge of a rechargeable battery, according to an embodiment of the present disclosure. As shown in FIG. 3, the battery charge limitation system in an embodiment may use this method to limit the amount of charge a rechargeable battery receives during or following the printed circuit board assembly line phase of the manufacture of an information handling system. As shown in FIG. 3, the battery charge limitation system may communicate a series of code instructions to the BMU controller in an embodiment during the printed circuit board assembly line phase. At block 302 in an embodiment, the printed circuit board assembly line phase may begin. During the printed circuit board assembly line phase of an information handling system in an embodiment, the processor, BMU controller, and main memory may be constructed, but the processor, BMU controller, and main memory may have not yet been integrated with the rechargeable battery of the information handling system. At block 304, in an embodiment, the battery charge limitation system may instruct the BMU controller to determine the BMU computer readable medium does not contain an internal data record indicating a first power-on event. This may indicate, in an embodiment, that the information handling system has not yet been shipped to the end user, and/or that the information handling system has not yet undergone any form of quality control.

At block 306, in an embodiment, the BMU controller may receive code instructions of the battery charge limitation system to limit the voltage received by the rechargeable battery such that the percentage value of the charge of the battery does not exceed a first set percentage value charge limit. The battery charge limitation system in an embodiment may communicate this first set value to the BMU controller by means of a control setting within firmware, operating as machine-readable executable code instructions residing in the BMU computer readable medium of the information handling system. The BMU controller may execute code instructions of the battery charge limitation system then to limit charging of the information handling system rechargeable battery at any time during the production phase of the information handling system.

As an example, in an embodiment, the BMU controller may receive code instructions of the battery charge limitation system in the form of a newly created control setting to instruct the BMU controller to limit the voltage received by the rechargeable battery such that the rechargeable battery may not charge beyond 60% of the full capacity of the rechargeable battery. As another example, in an embodiment, the BMU controller may receive code instructions of the battery charge limitation system in the form of a newly created control setting to instruct the BMU controller to limit the voltage received by the rechargeable battery such that the rechargeable battery may not charge beyond 85% of the full capacity of the rechargeable battery. These are just two examples of embodiments, and other embodiments may include the battery charge limitation system instructing the BMU controller to limit the voltage received by the rechargeable battery such that the rechargeable battery may not charge beyond any set percentage value of the full charge capacity of the rechargeable battery between 1% and 99%. As an example instruction to limit the voltage received by the rechargeable battery may include a command code from system management software running in an operating system to request the state of limiting the battery charge. In this way, the battery charge limitation system may instruct the BMU controller to limit voltage received by the rechargeable battery to a set percentage of the full capacity of the rechargeable battery in an aspect of the present disclosure.

At block 308, in an embodiment, the BMU controller may receive code instructions for a first power-on setting of the battery charge limitation system such that it is set to store a first internal data record in the BMU computer readable medium indicating detection of a first power-on event upon the next powering up of the processor. The next powering up of the information handling system or the processor will be deemed a first power on event. The next powering up of the processor in an embodiment may occur when the processor and main memory next move from an off state to an on state, and/or when the system is restarted or reset. The battery charge limitation system in an embodiment may instruct the BMU controller to take these actions via creation of a set first power-on setting control settings within the firmware or via operating as machine-readable executable code instructions stored in the BMU computer readable medium. As an example, in an embodiment, the battery charge limitation system first power-on setting may instruct the BMU controller to store a first internal data record in the BMU computer readable medium indicating a first power-on event upon the next powering up of the processor using a system management command from software running in an operating system uniquely identifying that a request to set the first power-on date upon next boot is requested. Establishing the code instructions in a first power-on setting to detect and record a first internal data record of the next powering up will later impact disengaging the charge limitation on charging the rechargeable battery as discussed further in embodiments herein.

At block 310, in an embodiment, the BMU controller may receive code instructions to remove the first set percentage value charge limit and allow the rechargeable battery to charge to full capacity upon detecting first internal data record in storage of the BMU computer readable medium indicating a first power-on setting has been recorded during a next start-up event. The battery charge limitation system in an embodiment may communicate this code instruction to the BMU controller in the form of an instruction to block or remove the set first battery charge limit upon detection of the first internal data record. In some embodiments, this instruction may include erasing or blocking the charge limitation setting control within the BMU computer readable medium. As an example, in an embodiment, the battery charge limitation system may be loaded with instructions for the BMU controller to remove or block application of the first set percentage value charge limit after detecting a stored first internal data record in the BMU computer readable medium has detected a first power-on event. In a particular example embodiment, the command code for a system management command from software running in an operating system uniquely identifying that a request to set the first power-on date upon next boot is requested may be loaded for execution of this removal or elimination of the rechargeable battery charge limitation.

At block 312, in an embodiment, the printed circuit board assembly line phase may end. In an embodiment, at this point in the manufacturing of the information handling system, the printed circuit board may be prepared for integration with other parts of the information handling system, including, but not limited to, the rechargeable battery. According to the embodiment of FIG. 3, the steps of installing the battery charge limitation system of the present disclosure occur during the printed circuit board assembly line phase of the manufacture of the information handling system. It is understood that in other embodiments, setting or installing aspects of the battery charge limitation system described above may be installed at other phases of manufacture or testing. This may include, for example, implementation of settings during the other parts assembly line phase or even upon the final completion of assembly of the information handling system. For example, setting the battery charge limitation system to detect the next powering on event is a first power on setting that may be established upon completion of the information handling system manufacture. This may be done so that control of charging the rechargeable battery level in the information handling system during manufacture or testing is limited and not changed by power on events until just before storage or shipping. It is understood that other aspects of the implementation of control of rechargeable battery charging via the battery charging limitation system may be install or set at other phases of manufacture as well as appropriate. In an aspect of the present embodiment, the battery charge limitation system may continue to enforce the limitation on charging the rechargeable battery such that even when in transit or storage, plugging in power to the information handling system prior to a first boot up by a user will still enforce the charging limitation. In a further aspect of the present disclosure, even if the information handling system remains plugged in after final shutdown at a factory line, the information handling system will not receive power at the rechargeable battery and the desired charge percentage level will not be exceeded.

Figure 4:
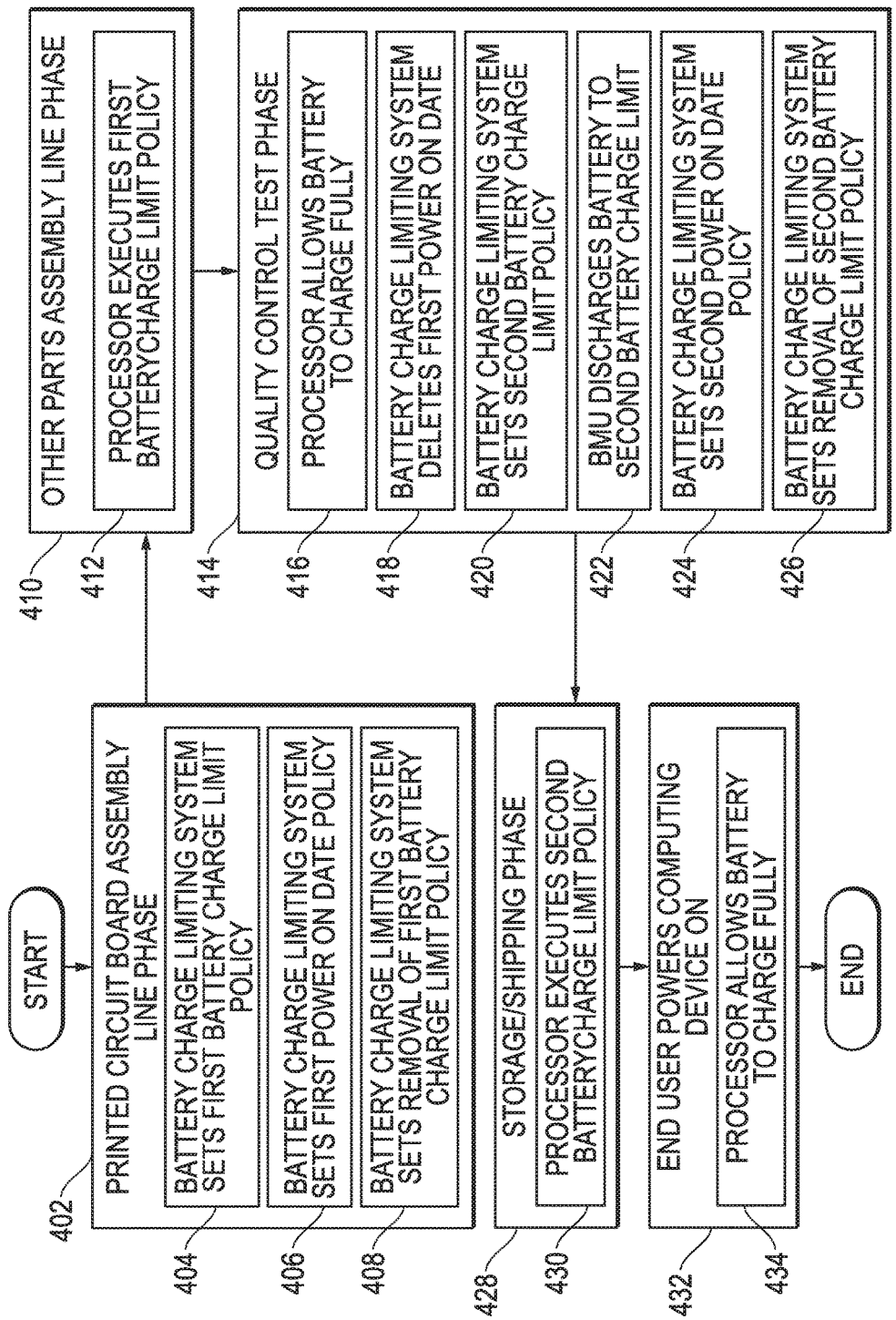
FIG. 4 is a flow diagram illustrating a method of limiting the charge of a rechargeable battery of a quality control tested information handling system prior to shipping or storage according to an embodiment of the present disclosure.

FIG. 4 is a flow diagram illustrating a method of limiting battery charging of a rechargeable battery in an information handling system undergoing a quality control test, according to an embodiment of the present disclosure. As shown in FIG. 4, the manufacturing and shipment timeline of an information handling system may include a printed circuit board assembly line phase, an other parts assembly line phase, a quality control test phase, a storage/shipping phase, and may conclude when the end user powers on the information handling system for the first time. As shown in block 402, during the printed circuit board assembly line phase in an embodiment, the battery charge limitation system may set a first battery charge limit 404, a first power-on setting to detect and record a next power on event 406, and a removal of first battery charge limit setting 408. The first battery charge limit 404 in an embodiment may be set to instruct the BMU controller to limit the amount of voltage received by the rechargeable battery to a set limit. The first power-on setting 406 in an embodiment may be set to instruct the BMU controller to store a first internal data record in the BMU computer readable medium upon the next power up of the processor, indicating a first power-on event. The removal of the first battery charge limit 408 may be set to instruct the BMU controller to remove the first battery charge limit upon detecting storage of a first internal data record indicating a first power-on event in the BMU computer readable medium and to allow the rechargeable battery to charge to full capacity.

As shown in block 410, in an embodiment, the other parts assembly line phase may occur. The other parts of the assembly line phase in an embodiment may include integration of the printed circuit board with other parts of the information handling system, including, but not limited to the rechargeable battery. During this phase, the BMU controller in an embodiment may execute the code instructions of the battery charge limitation system to automatically limit the charge of the rechargeable battery 412 to a first set percentage value of the full battery charge capacity. In an embodiment, the other parts assembly line phase may produce a fully assembled information handling system, ready for storage or shipment from the factory. As described above, storing or shipping a fully charged rechargeable battery over a period of time can degrade the battery, affect performance of the battery throughout its lifetime, and present safety issues. Further, discharging a battery prior to storage or shipping can be time consuming, and manual factory processes to limit the battery charging, such as unplugging the AC adapter when above a high-threshold and re-inserting the AC adapter when below a low-threshold may be error prone and require additional human resources to manage and implement. In an embodiment, the battery charge limitation system of the present disclosure may be implemented to automatically limit the amount of charge the rechargeable battery may receive at any phase of manufacture of the information handling system where the rechargeable battery may receive charge. It is understood that application of the battery charge limitation system may occur at other phases in accordance with the embodiments described herein. In the described embodiment, the limit on charge received by the rechargeable battery will occur at some point during the other parts assembly line phase to avoid the issues of storing a fully charged rechargeable battery.

As an example, in an embodiment, the BMU controller during the assembly line phase 410 may limit the voltage received by the rechargeable battery such that the rechargeable battery may not charge beyond 60% of the full capacity of the rechargeable battery. This is just one example embodiment, and other embodiments may include the BMU controller limiting the voltage received by the rechargeable battery such that the rechargeable battery may not charge beyond any set percentage value of the full charge capacity of the rechargeable battery between 1% and 99%.

As shown in block 414, in an embodiment, an information handling system may also undergo a quality control test phase. During the quality control test phase embodiment, the information handling system may be powered on, causing the BMU controller to store an internal data record indicating a first power-on event. The storage of a first power-on setting in an embodiment may also cause the BMU controller to remove the battery charge limit and allow the rechargeable battery to charge to full capacity. Indeed, in some embodiments, the quality control test phase may require the rechargeable battery to charge to full capacity for complete testing conditions. However, the quality control test phase in an embodiment may occur prior to the storage and/or shipping phase 426 of an information handling system. So, fully charging a rechargeable battery during the quality control test phase and allowing this charge to remain during the storage/shipping phase can degrade the battery and affect performance of the battery throughout its lifetime. Thus, the quality control test phase in an embodiment may further include resetting the battery charge limit setting prior to the storage/shipping phase, so as to limit the charge of the battery during storage and shipment to the end user. Steps may be taken at any point during or after testing to discharge the rechargeable batteries to a lower charge level in some embodiments. For example, as shown at block 420, in an embodiment, the BMU controller may discharge the rechargeable battery percentage charge to the second battery charge limit. For example, in an embodiment, the BMU controller may execute code instructions to limit voltage received by the rechargeable battery and direct the information handling system to draw power necessary for operation of its processes for quality control testing or otherwise from the rechargeable battery, despite the controller receiving voltage from an alternating current source external to the information handling system, until the percentage value charge of the rechargeable battery is equal to or less than the second set percentage value charge limit. In this way, the battery charge limitation system restricts incoming power to the rechargeable battery and the information handling system operates off of battery power when a charge percentage level is designated even if AC power is connected. Moreover, to discharge the rechargeable battery in such an example embodiment will not require removal AC power to be removed.

In one aspect, this discharge level may be to a level at or below the first battery charge limit setting level. Thus, if the first battery charge limit setting is re-implemented during testing, no error condition would be triggered by a battery charge level being above the first battery charge limit. Then a second power-on setting may be set to detect the next power up event and store an internal record of the same. The second power on setting is established before shipping or storage. The second power-on setting would be similar to the above first power-on setting except that there was an interim power-on event detected due to the information handling system being selected for testing requiring a first power-on event.

In an embodiment, the quality control test phase may include the battery charge limitation system instructing the BMU controller to delete the stored internal data record indicating the first power-on event that occurred for the testing phase 418, to set a second battery charge limit 420, to discharge the rechargeable battery to a second battery charge limit 422, to set a second power-on setting to detect and record a later power-on event after testing 424, and to set a removal of second battery charge limit setting 426 after the later power-on event. The second power-on setting 424 in an embodiment may instruct the BMU controller to detect and store in the BMU computer readable medium a second internal data record a second power-on event. The second power-on event may occur upon the next power up of the processor and main memory from an off state. The next power up occurring after the quality control test phase is complete, and in some embodiments after shipping and storage. The second battery charge limit 418 in an embodiment may instruct the BMU controller to limit the amount of voltage received by the rechargeable battery to a set second charge limit level during or after the quality control test phase, and to continue limiting the voltage until a second internal data record indicating a second power-on event is detected as stored in the BMU computer readable medium. This approach may allow for a limited charge of the rechargeable battery during the storage/shipping phase 428 of the information handling system. The battery charge limit system may be set to remove the second battery charge limit upon storage of a second internal data record indicating a second power-on setting, and to allow the rechargeable battery to charge to full capacity.

As shown in block 428, in an embodiment, an information handling system that has undergone a quality control test may also undergo a storage and/or shipping phase in which the information handling system, having been fully assembled, may be stored for some time prior to shipping to the end customer, and shipped to the end customer. In some instances, the shipping phase of the information handling system may be protracted, such as, when the end user is geographically located distantly from the manufacturing facility. During the storage and shipping phase of an information handling system in an embodiment, as shown in block 428, the BMU controller has limited the amount of voltage received by the rechargeable battery 430 to a set second limit, to avoid degrading the battery, affecting battery lifetime performance, and presenting safety issues.

As shown in block 432, in an embodiment, following the manufacturing, storage, and shipping phases, the end user may receive and power on the information handling system. The end user powering on the information handling system in an embodiment may signify to the BMU controller that the storage and shipping phase of the information handling system has concluded. The end user power-on event may be recorded as the second power-on event in the embodiment. Once the end user receives the information handling system, it may be no longer desirable to limit the charge of the rechargeable power to any number below 100%. As such, in an embodiment, the BMU controller may execute the code instructions of the battery charge limitation system to remove or cancel the second battery charge limit, and allow the battery to charge to full capacity after the end user powers on the information handling system. The cancellation may occur upon detection of the storage of a second internal data record reflecting the second power-on event.

Figure 5:
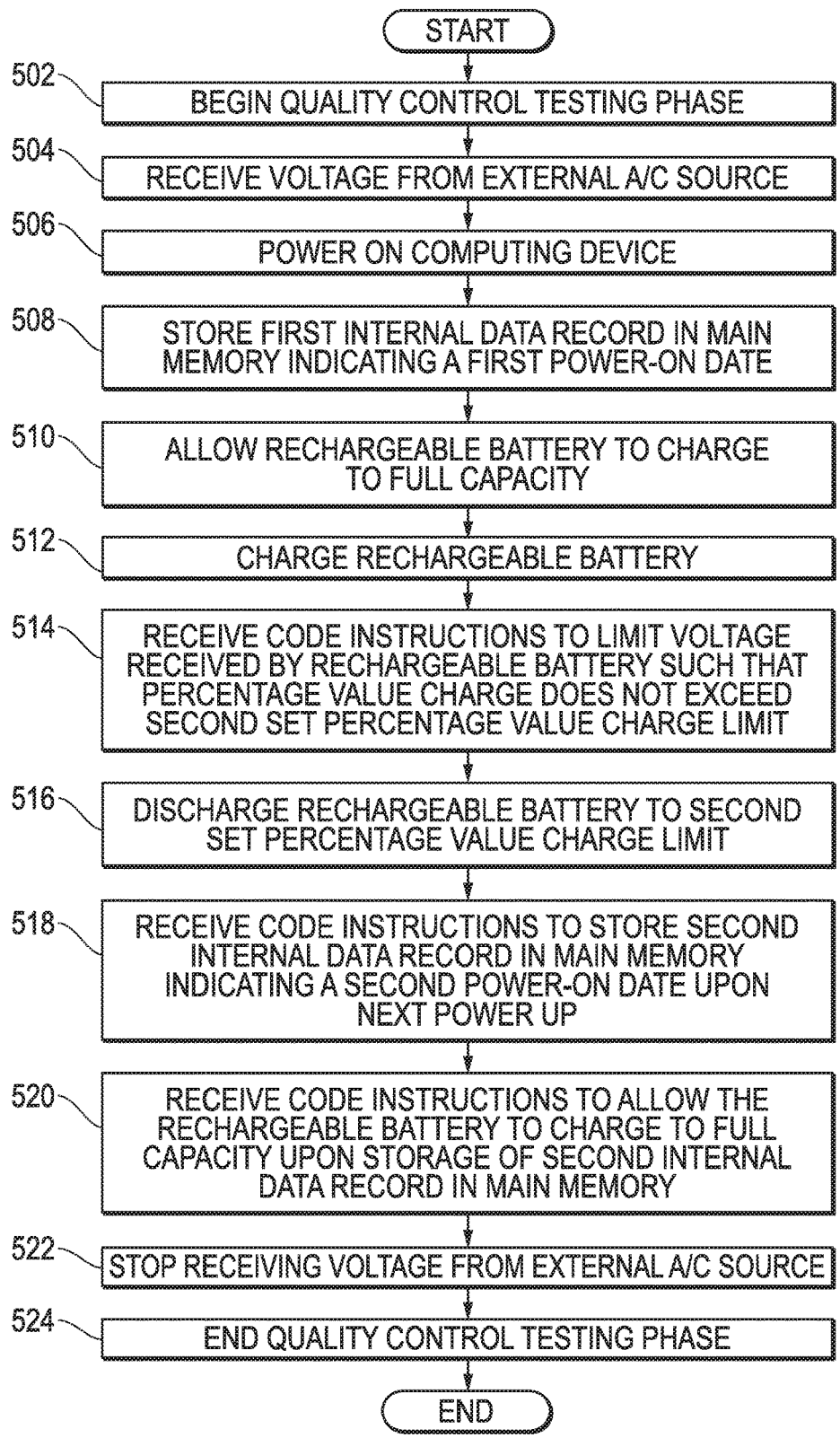
FIG. 5 is a flow diagram illustrating a method of instructing a BMU controller of a quality control tested information handling system to limit the charge of a rechargeable battery prior to shipping or storage according to an embodiment of the present disclosure.

FIG. 5 is a flow diagram illustrating a method of instructing a BMU controller to limit the charge of a rechargeable battery to a set percentage value charge limit, according to an embodiment of the present disclosure. As shown in FIG. 5, the battery charge limitation system in an embodiment may use this method to limit the amount of charge a rechargeable battery receives following the quality control check phase of the manufacture of an information handling system. At block 502 in an embodiment, the quality control testing phase may begin. As discussed above, it is understood only a sample of the information handling systems manufactured in any given facility will undergo a quality control testing phase. At block 504, in an embodiment, the BMU controller may receive power from an alternating current source external to the information handling system.

At block 506 in an embodiment, the information handling system may be powered on. The information handling system in an embodiment may be powered on during a quality control check in order to allow technicians to assess whether the information handling system electrical systems and/or software function properly, which requires the information handling system to be powered on. At block 508, in an embodiment, the BMU controller may be set to detect and may detect the powering on of the device and execute code instructions of the battery charge limitation system to store an internal data record in the BMU computer readable medium indicating a first power-on event. The BMU controller in an embodiment may store this internal data record in accordance with the code instructions it received during the printed circuit board assembly phase. At block 510, in an embodiment, the BMU controller may execute code instructions of the battery charge limitation system to remove the first set percentage value charge limit and allow the rechargeable battery to charge to full capacity. At block 512, in an embodiment, the rechargeable battery may be charged beyond the previously set percentage value charge limit. In fact, the quality control testing phase may involve the rechargeable battery to charge to its full capacity.

As discussed above, the quality control test phase in an embodiment may occur prior to the storage and/or shipping phase of an information handling system. So, fully charging a rechargeable battery during the quality control test phase and allowing this charge to remain during the storage/shipping phase can degrade the battery, affect performance of the battery throughout its lifetime, and present safety issues. Thus, the quality control test phase in an embodiment may further include setting a second battery charge limit prior to the storage/shipping phase.

At block 514, the rechargeable battery may be discharged to a second set percentage value charge level that is at or below the second percentage value charge limit. For example, the controller in an embodiment may execute code instructions to limit the voltage or power received by the rechargeable battery, and direct the information handling system to draw power necessary for operation of its processes from the rechargeable battery, despite the controller receiving voltage from an alternating current source external to the information handling system, until the percentage value charge of the rechargeable battery is equal to or less than the second set percentage value charge limit. This second set percentage value charge limit may be equivalent to the previous first set percentage value charge limit in some embodiments, or may have another value in other embodiments. For example, in one embodiment, the battery charge limitation system may have set the first percentage value charge limit prior testing such that the rechargeable battery may not charge beyond 60% of its full capacity. During or after the testing phase discharge of the rechargeable battery may be necessary to reduce charge level. In one embodiment, the discharge may occur to a charge level at or below the percentage value charge limit to avoid error conditions and as a guideline of a permissible storage or shipping charge level. In an example embodiment, the second set percentage value charge limit may be 85% of the full battery charge capacity at block 514 to avoid the necessity of discharging all the way down to the first percentage value charge limit of 60%.

As another example, in another embodiment, the battery charge limitation system may set the first percentage value charge limit prior to the quality testing phase such that the rechargeable battery may not charge beyond 60% of its full capacity, but discharge the rechargeable battery during or after the quality control test phase to a second set percentage value charge limit also set at 60% of the full battery charge capacity at block 514. These are only two examples of embodiments, and other embodiments may include a first set percentage value charge limit and second set percentage value charge limit of any set percentage value of the full charge capacity of the rechargeable battery between 1% and 99%, or any combination of any two set percentage values of the full charge capacity of the rechargeable battery between 1% and 99%.

At block 516, in an embodiment, the BMU controller may receive code instructions of the battery charge limitation system to limit the voltage received by the rechargeable battery such that the percentage value of the charge of the battery does not exceed a second set percentage value charge limit. The battery charge limitation system in an embodiment may communicate this set value to the BMU controller via a control setting within firmware, operating as machine-readable executable code instructions residing in the BMU computer readable medium of the information handling system. As an example, in an embodiment, the battery charge limitation system may instruct BMU controller to limit voltage received by the rechargeable battery to a set percentage of the full capacity of the rechargeable battery using the command code from system management software running in an operating system to request the state of limiting the battery charge.

At block 518, in an embodiment, the BMU controller may receive code instructions of the battery charge limitation system to store a second internal data record in the BMU computer readable medium indicating a second power-on setting upon the next powering up event of the processor or other components of the information handling system. The next powering up of the processor in an embodiment may occur when the processor next moves from an off state to an on state. The battery charge limitation system in an embodiment may be set with a second power-on setting such that the system will detect the presence of a second internal data record. This setting may be second power-on control setting within firmware or as other machine-readable executable code instructions stored in the BMU computer readable medium. As an example, in an embodiment, the battery charge limitation system may instruct the BMU controller to store a second internal data record in the BMU computer readable medium indicating a second power-on setting upon the next powering up event of the processor using the command code for a system management command from software running in an operating system uniquely identifying that a request to set the first power-on date upon next boot is requested.

At block 520, in an embodiment, the BMU controller may receive code instructions of the battery charge limitation system to remove the second set percentage value charge limit and allow the rechargeable battery to charge to full capacity upon detecting the second internal data record in the BMU computer readable medium indicating a second power-on setting. The battery charge limitation system in an embodiment may communicate this code instruction setting to the BMU controller in the form of creation of an instruction setting for removal of second battery charge limit. The setting to remove the second battery charge limit may reside within the firmware or as other machine-readable executable code instructions stored in the BMU computer readable medium. As an example, in an embodiment, the battery charge limitation system may instruct the BMU controller to remove the second set percentage value charge limit upon storage of a second internal data record in the BMU computer readable medium indicating a second power-on setting using the command code for a system management command from software running in an operating system uniquely identifying that a request to set the first power-on date upon next boot is requested.

At block 522, in an embodiment, the BMU controller may be unplugged and stop receiving voltage from the alternating current source external to the computing device. At block 524, in an embodiment, the quality control testing phase may end. The battery charge limitation system may be set with the second power-on setting to detect the next power up event. In an embodiment, at this point in the manufacturing of the information handling system, the information handling system may be prepared for shipment to an end user.

Figure 6:
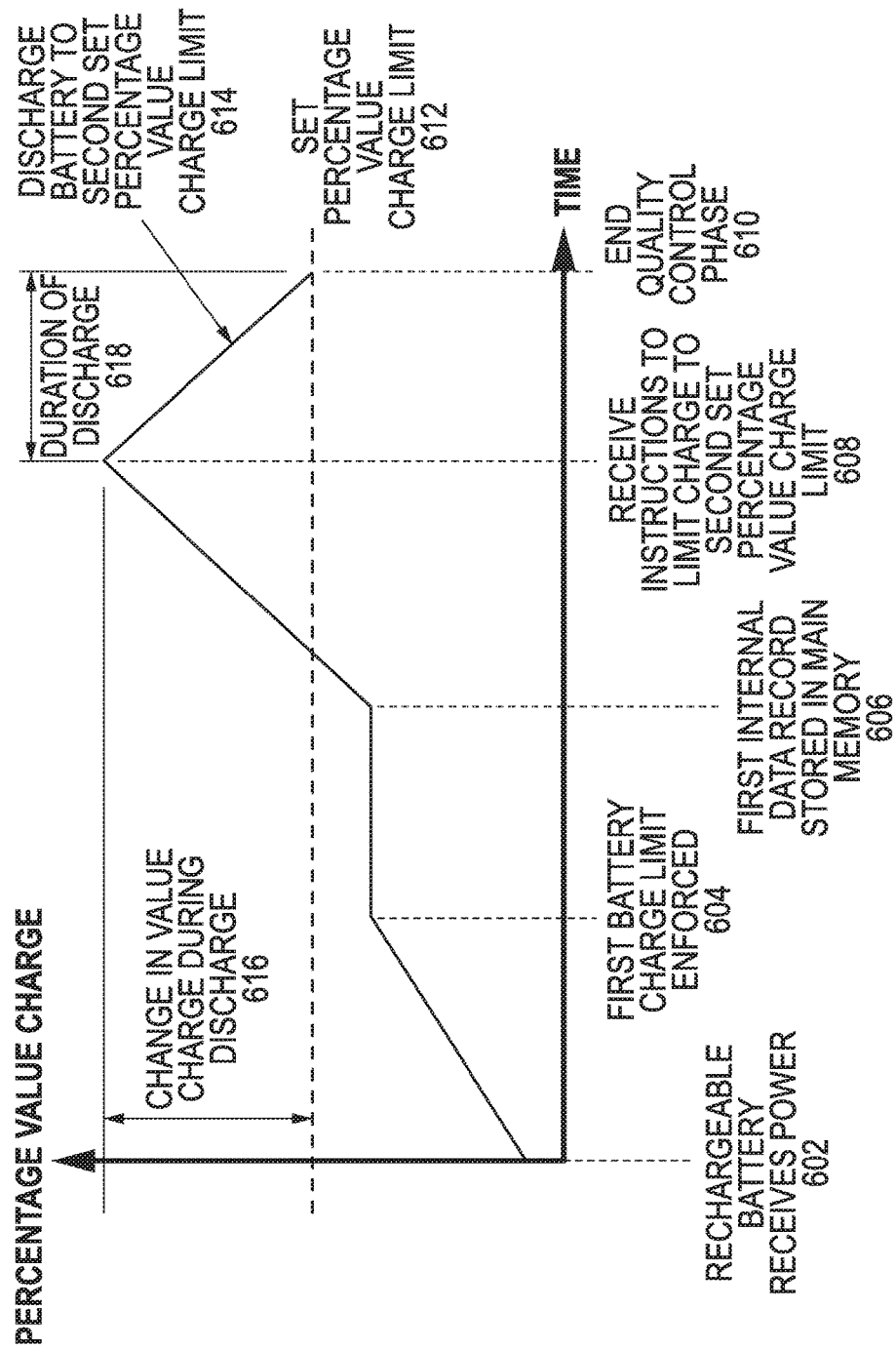
FIG. 6 is a graphic diagram illustrating the percentage value charge of a rechargeable battery over time, according to an embodiment of the present disclosure.

FIG. 6 is a graphic diagram illustrating the percentage value charge of a rechargeable battery over time, according to an embodiment of the present disclosure. As shown in FIG. 6, in an embodiment, the percentage value charge of a rechargeable battery may vary over time, between the earliest time at which the rechargeable battery may receive power (typically during the other parts assembly phase of FIGS. 2 and 4), and the end of the quality control phase. FIG. 6 shows a graph of the change in the percentage value charge of the rechargeable battery, as depicted along the Y Axis, and the time between the earliest time at which the rechargeable battery may receive power and the end of the quality control phase, as depicted along the X Axis. As shown in FIG. 6, at a time 602, the rechargeable battery in an embodiment may receive power. The time 602 in an embodiment may occur during the other parts assembly phase, when the rechargeable battery is operably connected to the processor and BMU controller. At a time 604, in an embodiment, the first battery charge limit may be enforced. As described above, the BMU controller may allow the rechargeable battery to charge to a first set percentage value charge limit, and once the rechargeable battery percentage value charge reaches that first set percentage value charge limit at time 604, the BMU controller may enforce the first battery charge limit by limiting the voltage received by the rechargeable battery. As also described above, the BMU controller enforces the first battery charge limit during either shipment of the computing device including the BMU controller and rechargeable battery to the end user, or during storage of the computing device including the BMU controller and rechargeable battery within the factory, prior to a random quality control test.

At a time 606, in an embodiment, a first internal data record may be stored in main memory. As discussed above, a first internal data record may be stored in main memory in one of two different scenarios: (1) the computing device including the rechargeable battery and the BMU controller being shipped to the end user and powered on by the end user; or (2) the computing device including the rechargeable battery and the BMU controller entering into a quality control check phase within the factory, prior to being shipped to the end user. In either situation, upon storage of the first internal data record in main memory, the BMU controller in an embodiment may remove the first battery charge limit and allow the rechargeable battery to charge to full capacity.

At a time 608, in an embodiment, the BMU controller may receive instructions to limit the charge of the rechargeable battery to a second set percentage value charge limit. As discussed above, during a quality control check of a computing device including the rechargeable battery and the BMU controller, the BMU controller may allow the rechargeable battery to charge to its full capacity, as shown by the measured value charge increase occurring between times 606 and 608 in FIG. 6. Also as discussed above, it may be desirable to decrease the value charge of the rechargeable battery following the quality control check and during the shipment phase of the computing device. As such, and as also discussed above, just prior to the end of the quality control phase, the BMU controller may receive an instruction to limit the percentage value charge of the rechargeable battery to a second set percentage value charge limit, as shown in FIG. 6 at time 608. The second set percentage value charge limit may be the same as, or different than the first set percentage value charge limit. In FIG. 6, the second set percentage value charge limit 612 is higher than the first percentage value charge limit, at which the BMU controller maintains the battery value charge between times 604 and 606. The battery percentage value charge at time 608 in an embodiment may be greater than, or equivalent to the second set percentage value charge limit 612.

At a time 610, in an embodiment, the quality control phase may be completed. As described above, the embodiment the battery percentage value charge at time 608 may be greater than, or equivalent to the second set percentage value charge limit 612. In the embodiment described with reference to FIG. 6, the percentage value charge of the rechargeable battery at time 608, when the BMU receives the instructions to limit the charge to the second set percentage value charge limit, is greater than the second set percentage value charge limit 612. In such an embodiment, the rechargeable battery may be discharged to the lower second set percentage value charge limit 612, prior to the end of the quality control phase at time 610. As shown in FIG. 6, between time 608 and time 610, the battery may be discharged to the second set value charge limit, as shown at 614. For example, the percentage value charge may decrease from a value higher than the second set percentage value charge limit down to the second set percentage value charge limit 612, as shown at 616. The time that elapses between 608 and time 610 may also be represented in an embodiment as the duration of the rechargeable battery discharge 618. As discussed above, in an embodiment, the discharge of the rechargeable battery may occur by disconnecting the BMU controller and rechargeable battery from an A/C source while allowing the processor to operate. In another embodiment, the discharge of the rechargeable battery may also occur by instructing the process to draw power to perform its operations from the rechargeable battery, despite the BMU controller being plugged into an A/C source. In other words, even while the computing device is plugged in to an external power source, the rechargeable battery may still be discharged to the second set percentage value charge limit, as shown in FIG. 6, at 614.

Figure 7:
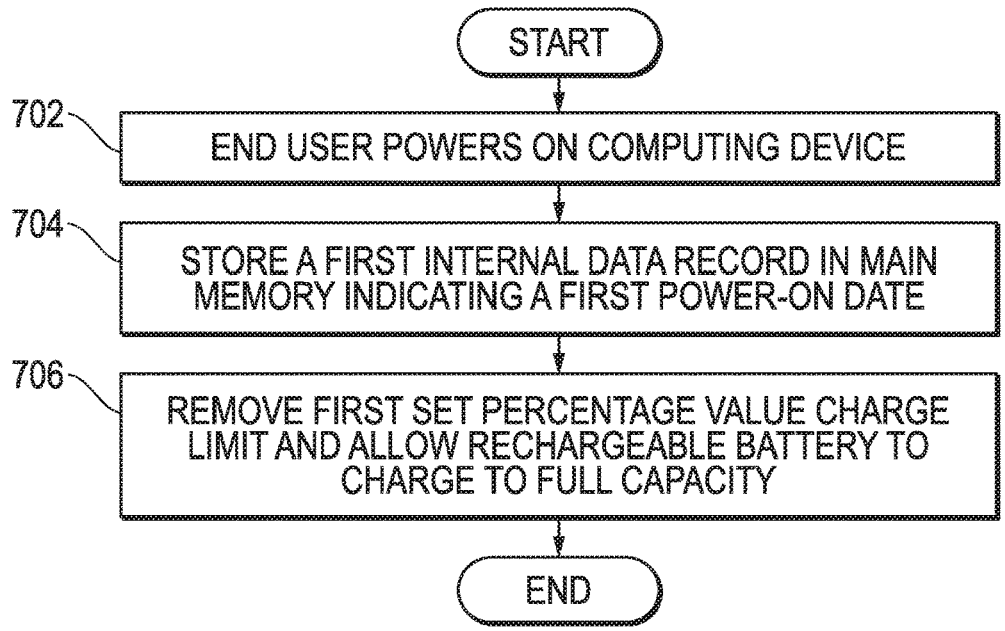
FIG. 7 is a flow diagram illustrating a method of automatically removing limitations upon the ability of a rechargeable battery to fully charge following delivery of an information handling system to an end user according to an embodiment of the present disclosure.

FIG. 7 is a flow diagram illustrating a method of automatically removing the first set percentage value battery charge limit upon the end user's powering up of the information handling system, according to an embodiment of the present disclosure. This method may apply to information handling systems that did not undergo a quality control check phase prior to shipment of the information handling system to the end user. It is understood that not every information handling system undergoes the quality control testing phase, and that an embodiment may or may not involve the quality control testing phase prior to the end user powering on the information handling system. As shown in FIG. 7, the battery charge limitation system in an embodiment may use this method, after the end user powers on the information handling system, to remove the limitation on the amount of charge a rechargeable battery receives. With the limitation remove, the rechargeable battery may charge to full capacity. At block 702, in an embodiment, after the printed circuit board assembly line phase, after the other parts assembly line phase, and after the storage/shipping phase, the end user may power on the information handling system.

At block 704, in an embodiment, the BMU controller may store a first internal data record in the BMU computer readable medium of a first power-on setting that is set to detect and record an occurrence of a next power-on event. In an embodiment, storage of a first internal data record in the BMU computer readable medium indicating a first power-on setting may indicate to the BMU controller the information handling system has been turned on after being shipped to the end-user, and that limiting the rechargeable battery's ability to charge to full capacity may no longer be desirable. At block 706, in an embodiment, the BMU controller may execute code instructions to remove the first set percentage value charge limit such that the BMU controller may allow the rechargeable battery to charge to full capacity. The method described with respect to FIG. 7 allows for the automatic removal of the set percentage value charge limit with no actions on behalf of the end user required, except the powering on of the processor and main memory.

Figure 8:
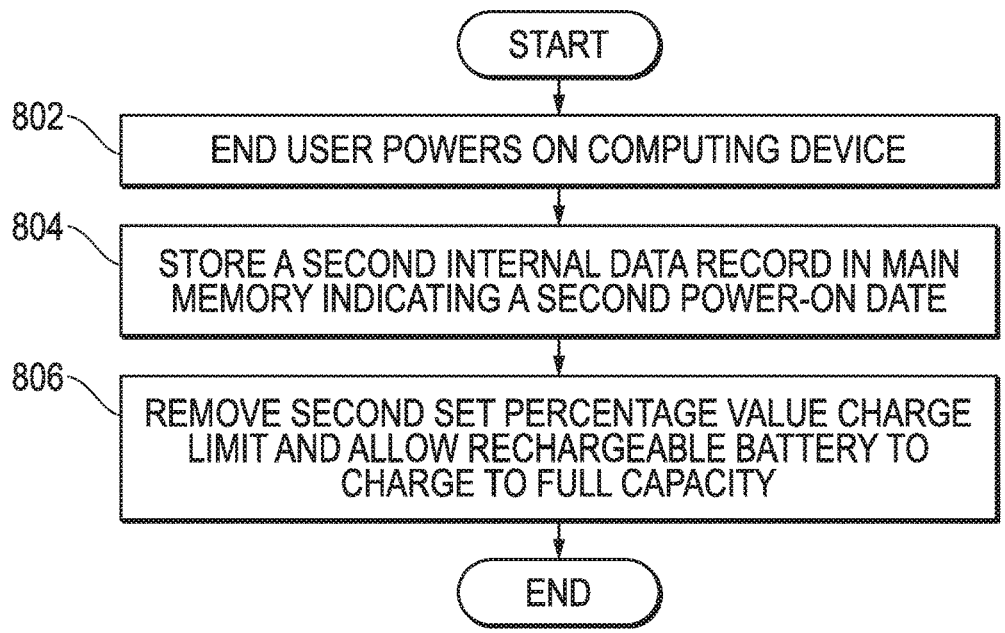
FIG. 8 is a flow diagram illustrating a method of automatically removing limitations upon the ability of a rechargeable battery to fully charge following a quality control check of an information handling system according to an embodiment of the present disclosure.

FIG. 8 is a flow diagram illustrating a method of automatically removing the second set percentage value battery charge limit upon the end user's powering up of the information handling system, according to an embodiment of the present disclosure. This method may apply to information handling systems that undergo a quality control check phase prior to shipment of the information handling system to the end user. It is understood that not every information handling system undergoes the quality control testing phase, and that an embodiment may or may not involve the quality control testing phase prior to the end user powering on the information handling system. As shown in FIG. 8, the battery charge limitation system in an embodiment may use this method, after the end user powers on the information handling system, to remove the limitation on the amount of charge a rechargeable battery receives, such that the rechargeable battery may charge to full capacity. At block 802, in an embodiment, following the printed circuit board assembly line phase, the other parts assembly line phase, the quality control test phase, and the storage/shipping phase, the end user may power on the information handling system.

At block 804, in an embodiment, the BMU controller may store a second internal data record in the BMU computer readable medium indicating a second power-on setting. In an embodiment, storage of a second internal data record in the BMU computer readable medium indicating a second power-on setting may indicate to the BMU controller the information handling system has been shipped to the end-user, and that limiting the rechargeable battery's ability to charge to full capacity may no longer be desirable. At block 806, in an embodiment, the BMU controller may execute code instructions to remove the second set percentage value charge limit such that the BMU controller may allow the rechargeable battery to charge to full capacity. The method described with respect to FIG. 8 allows for the automatic removal of the set percentage value charge limit with no actions on behalf of the end user required, except the powering on of the processor and main memory.

The blocks of the flow diagrams discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating a BMU controller comprising:
   a rechargeable battery;
   a BMU controller to determine battery charge percentage value;

a memory device for storage of a first internal data record indicating a first power-on event; and the controller operatively coupled to the memory device and the rechargeable battery;

the controller executing machine-readable executable code instructions to determine the memory device contains no first internal data record indicating the first power-on event, and to limit voltage received by the rechargeable battery such that the percentage value charge of the rechargeable battery does not exceed a first set percentage value charge limit; and the controller receiving machine-readable executable code instructions operable to record the first internal data record in the memory device indicating the first power-on event when a processor and a main memory of the information handling system are next powered on from an off state.

2. The information handling system operating the BMU controller of claim 1, further comprising:

the processor and the main memory of the information handling system being powered on from an off state and the controller receiving the first internal data record indicating the first power-on event;

the controller executing the machine-readable executable code instructions to remove the first set percentage value charge limit such that the processor allows the rechargeable battery to charge to full capacity in response to determining the memory device contains the first internal data record indicating the first power-on event.

3. The information handling system operating the BMU controller of claim 2 further comprising:

the controller executing code instructions to remove the first internal data record indicating the first power-on event from the memory device and to remove the first set percentage value charge limit such that the rechargeable battery may charge to its full capacity;

the controller receiving voltage from an alternating current source external to the information handling system;

the controller receiving machine-readable executable code instructions to record a second internal data record in the memory device indicating a second power-on event when the processor and the main memory of the information handling system are next powered on from an off state, and upon storing the second internal data record indicating a second power-on event, to remove the second set percentage value charge limit and allow the rechargeable battery to charge to full capacity; and the controller executing code instructions to limit voltage received by the rechargeable battery and direct the information handling system to draw power necessary for operation of its processes from the rechargeable battery, despite the controller receiving voltage from an alternating current source external to the information handling system, until the percentage value charge of the rechargeable battery is equal to or less than the second set percentage value charge limit.

4. The information handling system operating the BMU controller of claim 3, further comprising:

the processor and the main memory being powered on from an off state after the controller receives code instructions to record the second internal data record in the main memory indicating the second power-on event; and the controller recording the second internal data record indicating the second power-on event, and removing the second set percentage value charge limit and allow the rechargeable battery to charge to full capacity.

5. The information handling system operating the BMU controller of claim 3, wherein the second set percentage value charge limit is less than or equal to 85%.

6. The information handling system operating the BMU controller of claim 1, the controller receiving machine-readable executable code instructions to record the first internal data record in the memory device indicating the first power-on event when a processor and a main memory of the information handling system are next powered on from an off state, and the memory device contains no first internal data record indicating the first power-on event prior to the information handling system being shipped to an end user.

7. The information handling system operating the BMU controller of claim 1, wherein the first set percentage value charge limit is less than or equal to 60%.

8. A method for limiting battery charging of an information handling system comprising:

determining a memory device operatively coupled to a BMU controller contains no first internal data record indicating a first power-on event;

limiting voltage received by a rechargeable battery, via the BMU controller, such that the percentage value of the charge of the rechargeable battery does not exceed a first set percentage value charge limit; and receiving code instructions operable to record a first internal data record in the memory device indicating the first power-on event when a processor and main memory of the information handling system are next powered on from an off state and upon storing the first internal data record indicating the first power-on event to remove the first set percentage value charge limit and allow the rechargeable battery to charge to full capacity.

9. The method for limiting battery charging of an information handling system of claim 8, further comprising:

powering on of the processor and the main memory from an off-state to an on-state;

recording the first internal data record in the memory device indicating a first power-on event; and removing the first set percentage value charge limit such that the BMU controller allows the rechargeable battery to charge to full capacity.

10. The method for limiting battery charging of an information handling system of claim 9, in which the powering on of the processor and the main memory of the information handling system from an off-state to an on-state occurs after the information handling system is shipped to an end user.

11. The method for limiting battery charging of an information handling system of claim 9 further comprising:

receiving voltage from an alternating current source external to the information handling system;

powering the information handling system from an off-state to an on-state during factory testing;

removing the first internal data record indicating a first power-on setting from the memory device operatively coupled to the BMU controller;

no longer limiting voltage received by the rechargeable battery such that the rechargeable battery may charge to its full capacity;

reducing the rechargeable battery percentage value charge to a second set percentage value charge after factory testing;

limiting voltage received by a rechargeable battery, via the BMU controller, such that the percentage value of the charge of the rechargeable battery does not exceed a second set percentage value charge limit;

directing the information handling system to draw power necessary for operation of its processes from the rechargeable battery, despite receiving voltage from an alternating current source external to the information handling system, until the percentage value charge of the rechargeable battery is equal to or less than the second set percentage value charge limit; and receiving instructions operable to store a second internal data record in the main memory indicating a second power-on event when the processor and the main memory are next powered on from an off state and upon storing the second internal data record indicating the second power-on event in the memory device to remove the second set percentage value charge limit and allow the rechargeable battery to charge to full capacity.

12. The method for limiting battery charging of an information handling system of claim 11, wherein the second set percentage value battery limit is less than or equal to 85%.

13. The method for limiting battery charging of an information handling system of claim 8 further comprising:

powering the information handling system from an off-state to an on-state during factory testing;

removing the first internal data record indicating a first power-on setting from the memory device operatively coupled to the BMU controller;

no longer limiting voltage received by the rechargeable battery such that the rechargeable battery may charge to its full capacity;

reducing the rechargeable battery percentage value charge to a level below the first set percentage value charge limit after factory testing;

limiting voltage received by a rechargeable battery, via the BMU controller, such that the percentage value of the charge of the rechargeable battery does not exceed the first set percentage value charge limit; and receiving instructions to reinstate code instructions to record a first internal data record in the memory device indicating the first power-on setting when the processor and the main memory are next powered on from an off state and to remove the first set percentage value charge limit and allow the rechargeable battery to charge to full capacity after shipping of the information handling system.

14. The method for limiting battery charging of an information handling system of claim 8, wherein the first set percentage value charge limit is less than or equal to 60%.

15. An information handling system operating a battery management unit controller comprising:

a rechargeable battery;

a BMU controller to determine battery charge percentage;

the BMU controller operable to record a first power-on event due to a next occurrence of a processor and main memory of the information handling system being powered on from an off state after shipping after a first power-on setting is set to detect the next occurrence of the processor and main memory being power on from an off state;

a memory device operatively coupled to the BMU controller;

the BMU controller executing machine-readable executable code instructions such that upon determining that the memory device contains no first internal data record indicating the first power-on event, to limit voltage received by the rechargeable battery such that the percentage value charge of the rechargeable battery does not exceed a first set percentage value charge limit; and the controller executing machine-readable executable code instructions such that upon determining that the memory device has recorded the first internal data record indicating the first power-on event, removing the first set percentage value charge limit allowing the rechargeable battery to charge to full capacity.

16. The information handling system operating the BMU controller of claim 15, the controller receiving machine-readable executable code instructions to record the first internal data record in the memory device indicating the first power-on event when a processor and a main memory of the information handling system are next powered on from an off state, and the memory device contains no first internal data record indicating the first power-on event prior to the information handling system being shipped to an end user.

17. The information handling system operating the BMU controller of claim 15, further comprising:

the BMU controller executing code instructions to remove the first internal data record indicating the first power-on event from the memory device and to remove the first set percentage value charge limit such that the rechargeable battery may charge to its full capacity;

the controller receiving voltage from an alternating current source external to the information handling system;

the processor receiving machine-readable executable code instructions operable to record a second internal data record in the main memory indicating a second power-on event when the processor and the main memory are next powered on from an off state, and to remove the second set percentage value charge limit and allow the rechargeable battery to charge to full capacity; and the controller executing code instructions to limit voltage received by the rechargeable battery and direct the information handling system to draw power necessary for operation of its processes from the rechargeable battery, despite the controller receiving voltage from an alternating current source external to the information handling system, until the percentage value charge of the rechargeable battery is equal to or less than the second set percentage value charge limit.

18. The information handling system operating the BMU controller of claim 17, further comprising:

the BMU controller executing machine-readable executable code instructions to record the second internal data record indicating a second power-on event, and to remove the second set percentage value charge limit such that the BMU controller allows the rechargeable battery to charge to full capacity.

19. The information handling system operating the BMU controller of claim 15, wherein the first set percentage value battery charge limit is less than or equal to 60%.

20. The information handling system operating the BMU controller of claim 15, wherein the second set percentage value battery charge limit is less than or equal to 85%.

* * * * *